United States Patent [19]
Liu

[11] Patent Number: 5,716,065
[45] Date of Patent: Feb. 10, 1998

[54] TANDEM BICYCLE

[76] Inventor: Ssu-Liu Liu, 5 F., No. 43, Alley 3, Lane 91, Sec. 4, Pateh Road, Taipei, Taiwan

[21] Appl. No.: 633,232

[22] Filed: Apr. 16, 1996

[51] Int. Cl.$^6$ ............................................. B62K 27/00
[52] U.S. Cl. ..................... 280/204; 280/239; 280/278; 280/287
[58] Field of Search ............................ 280/239, 204, 280/231, 292, 278, 287; 482/57, 65

[56] References Cited

U.S. PATENT DOCUMENTS

| 5,067,738 | 11/1991 | O'Connor | 280/239 |
| 5,269,548 | 12/1993 | Milligan | 280/204 |
| 5,470,088 | 11/1995 | Adams | 280/204 |

FOREIGN PATENT DOCUMENTS

| 2053546 | 4/1993 | Canada | 280/239 |
| 872374 | 6/1942 | France | 280/231 |
| 1077941 | 11/1954 | France | 280/239 |
| WO 94/19230 | 9/1994 | WIPO | 280/287 |

*Primary Examiner*—Daniel G. DePumpo
*Attorney, Agent, or Firm*—Varndell Legal Group

[57] ABSTRACT

A tandem bicycle which includes a bicycle and a rear cycle unit coupled to the seat tube of the bicycle by a coupling, the rear cycle unit including a top tube, a down tube, a bottom bracket, a seat tube, a saddle and post assembly, a seat stay and bottom fork assembly, a free wheel, a crank and pedal assembly, and a handlebar, wherein the top tube and down tube of the rear cycle unit are respectively comprised of two sections pivotably connected together and secured in the operative position by a lock pin so that the rear cycle unit can be collapsed when not in use; a disk is mounted on the crank and pedal assembly and turned by it; an adjustable damper is mounted on the seat tube and down tube of the rear cycle unit and controlled by an adjustment screw to give a damping force to the disk.

3 Claims, 7 Drawing Sheets

TANDEM BICYCLE

BACKGROUND AND SUMMARY OF THE INVENTION

The present invention relates to tandem bicycles, and relates more particularly to such a tandem bicycle specifically designed for the riding of an adult and a child which is comprised of a bicycle and a folding collapsible rear cycle unit coupled to the bicycle by a coupling.

Regular two-seat tandem bicycles are designed for the riding of two persons together. The two riders can respectively propel the tandem bicycles through a respective chain transmission mechanism. However, when this structure of two-seat tandem makes a turn, the child who sits behind may fall from the saddle. Furthermore, regular two-seat tandem bicycles are not collapsible, therefore they need much storage space when not in use.

The present invention has been accomplished to provide a tandem bicycle specifically designed for the riding of an adult and a child which eliminates the aforesaid problems.

According to one aspect of the present invention, the tandem bicycle is comprised of a bicycle and a rear cycle unit coupled to the seat tube of the bicycle by a coupling. The rear cycle unit is comprised of a top tube, a down tube, a bottom bracket, a seat tube, a saddle and post assembly, a seat stay and bottom fork assembly, a free wheel, a crank and pedal assembly, and a handlebar. The top tube and down tube of the rear cycle unit are respectively comprised of two sections pivotably connected together and secured in the operative position by a lock pin so that the rear cycle unit can be collapsed when not in use.

According to another aspect of the present invention, a disk is mounted on the crank and pedal assembly and turned by it. When the crank and pedal assembly is pedaled, the disk runs idle without driving the free wheel of the rear cycle unit.

According to still another aspect of the present invention, an adjustable damper is mounted on the seat tube and down tube of the rear cycle unit and controlled to give a damping force to the disk. The adjustable damper comprises a locating plate fixedly connected to the seat tube and down tube of the rear cycle unit and having a screw hole, a substantially U-shaped spring plate having a front end connected to the locating plate and made with a through hole, and a rear end fixedly mounted with a friction element, and an adjustment screw threaded into the screw hole of the locating plate and inserted through the through hole of the front end of the spring plate and stopped against the rear end of said spring plate. The friction element is forced by the rear end of the spring plate into contact with the disk when said adjustment screw is threaded forwards, or moved by the rear end of the spring plate away from the disk when the adjustment screw is turned backwards.

DETAILED DESCRIPTION OF THE PREFERRED EMBODIMENT

Figure 1:
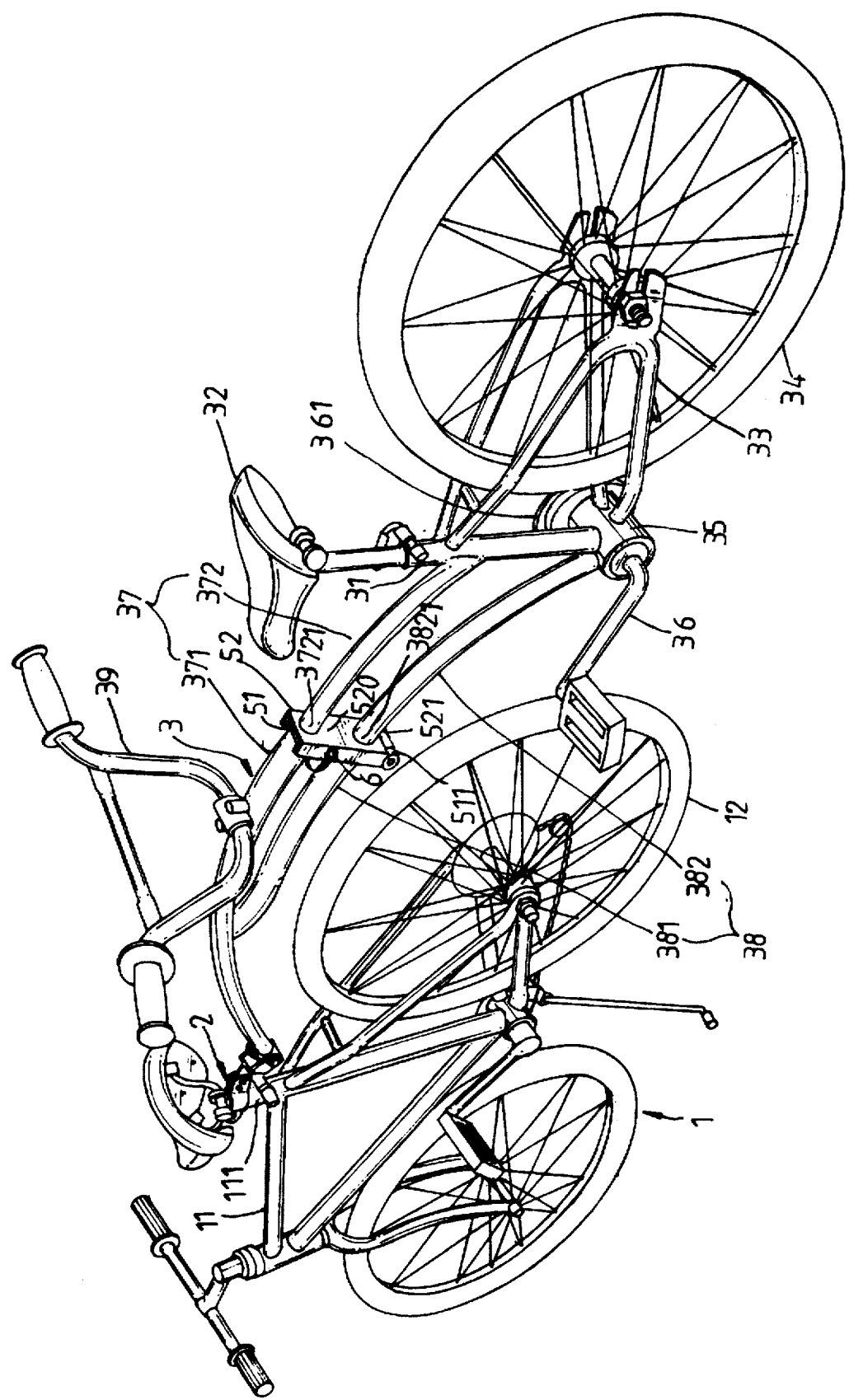
FIG. 1 is an elevational view of a tandem bicycle according to the present invention.
Figure 2:
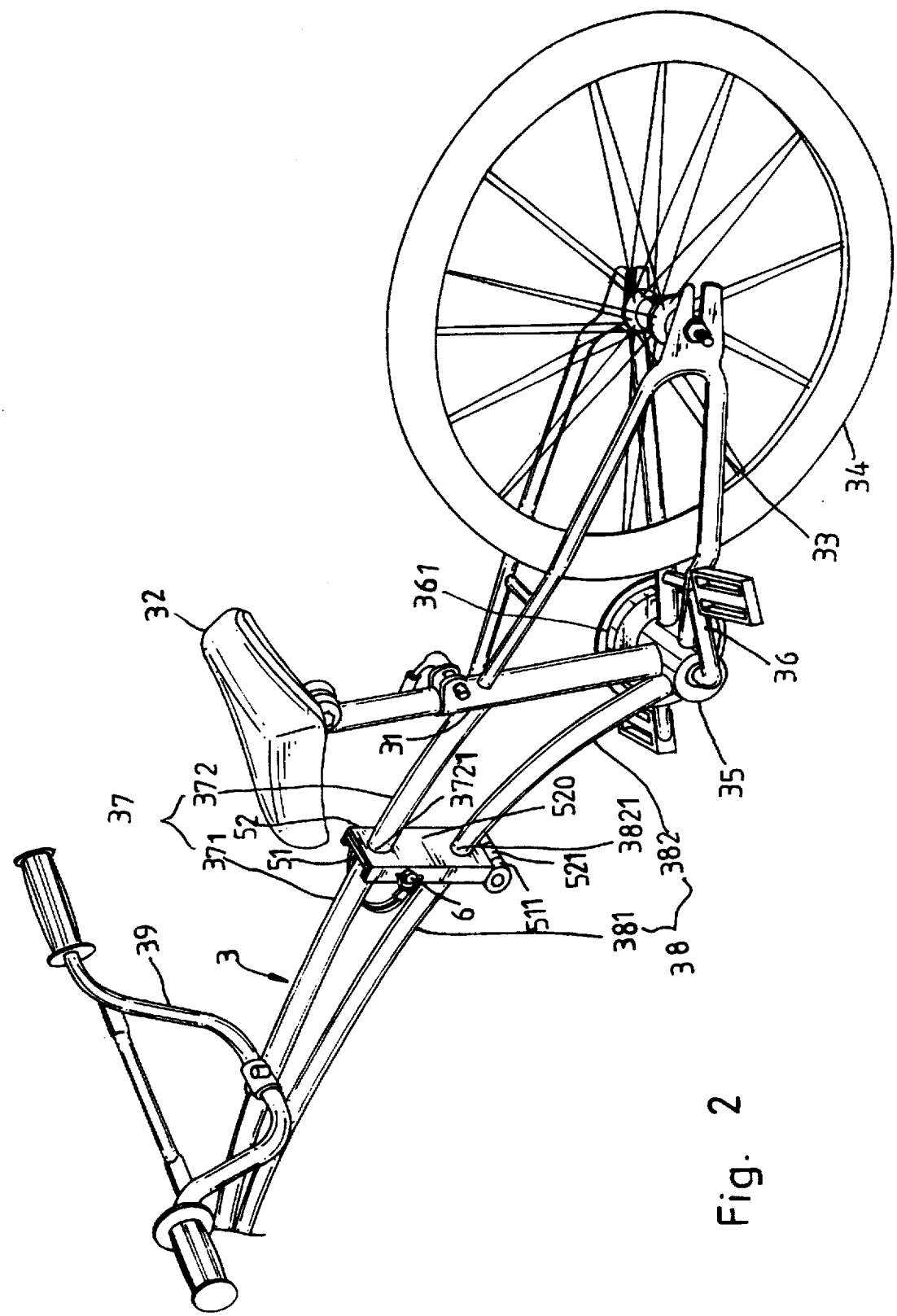
FIG. 2 is an elevational view in an enlarged scale of the rear cycle unit of the tandem bicycle shown in FIG. 1.
Figure 3:
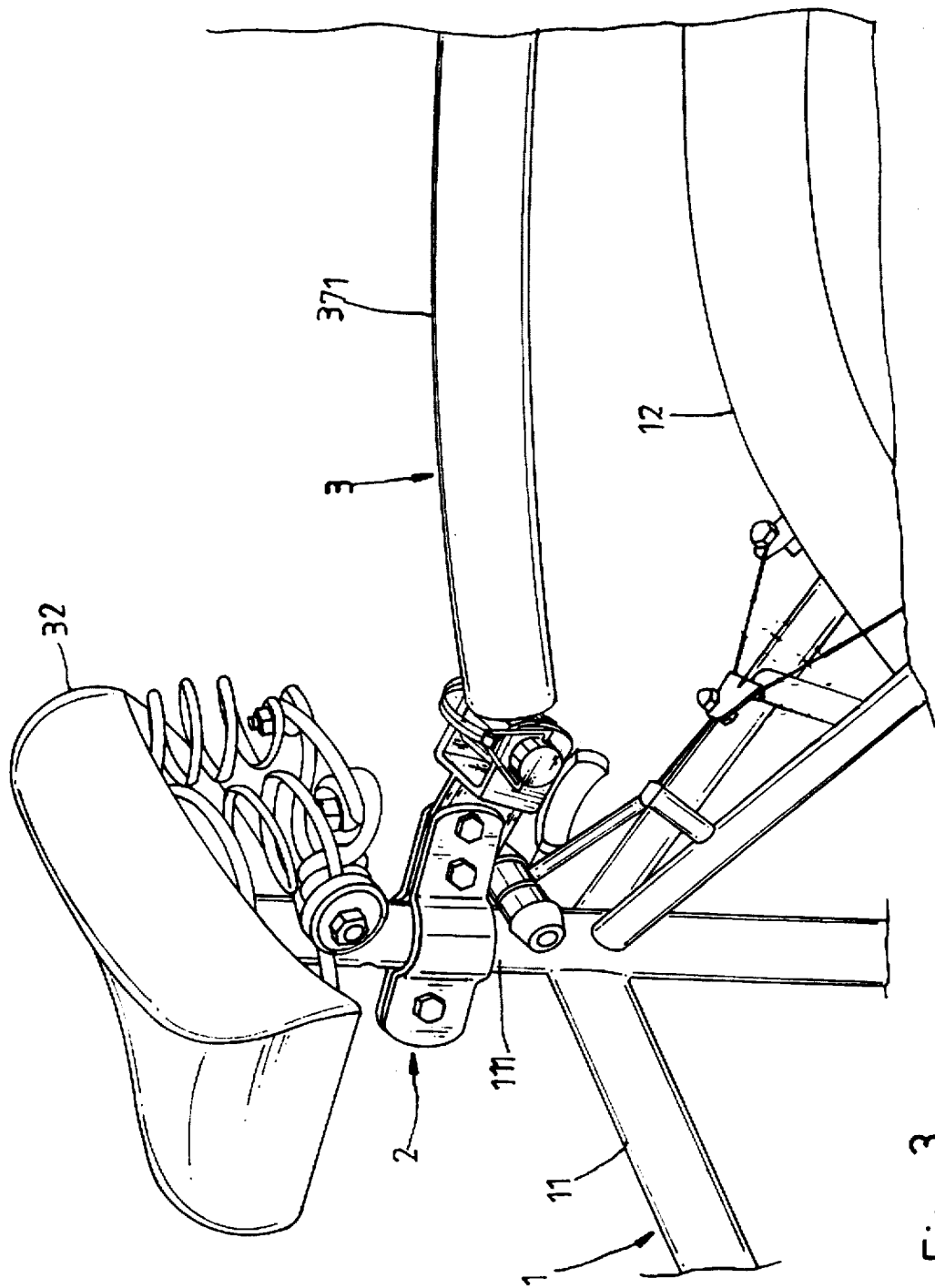
FIG. 3 is an enlarged view of a part of the tandem bicycle shown in FIG. 1, showing the coupling connected between the top tube of the rear cycle unit and the seat tube of the bicycle.

Referring to FIGS. 1, 2, and 3, a tandem bicycle in accordance with the present invention is generally comprised of an independent bicycle 1 for the riding of an adult, a coupling 2 fixedly secured to the seat tube 111 of the bicycle frame 11 of the bicycle 1, and a rear cycle unit 3 connected to the coupling 2 for the riding of a child. The rear cycle unit 3 comprises a bottom bracket 35, a seat tube 31 raised from the bottom bracket 35, a saddle and seat post assembly 32 mounted on the seat tube 31 at the top, a free wheel 34, a seat stay and bottom fork assembly 33 connected to the bottom bracket 35 and the seat tube 31 to hold the free wheel 34, a crank and pedal assembly 36 coupled to the bottom bracket 35. A top tube 37 having a rear end fixedly connected to the seat tube 31 and a front end coupled to the coupling 2, a down tube 38 having a rear end fixedly connected to the bottom bracket 35 and a front end fixedly connected to the top tube 37 and spaced around the rear wheel 12 of the bicycle 1, and a handlebar 39 fixedly mounted on the top tube 37.

Figure 4:
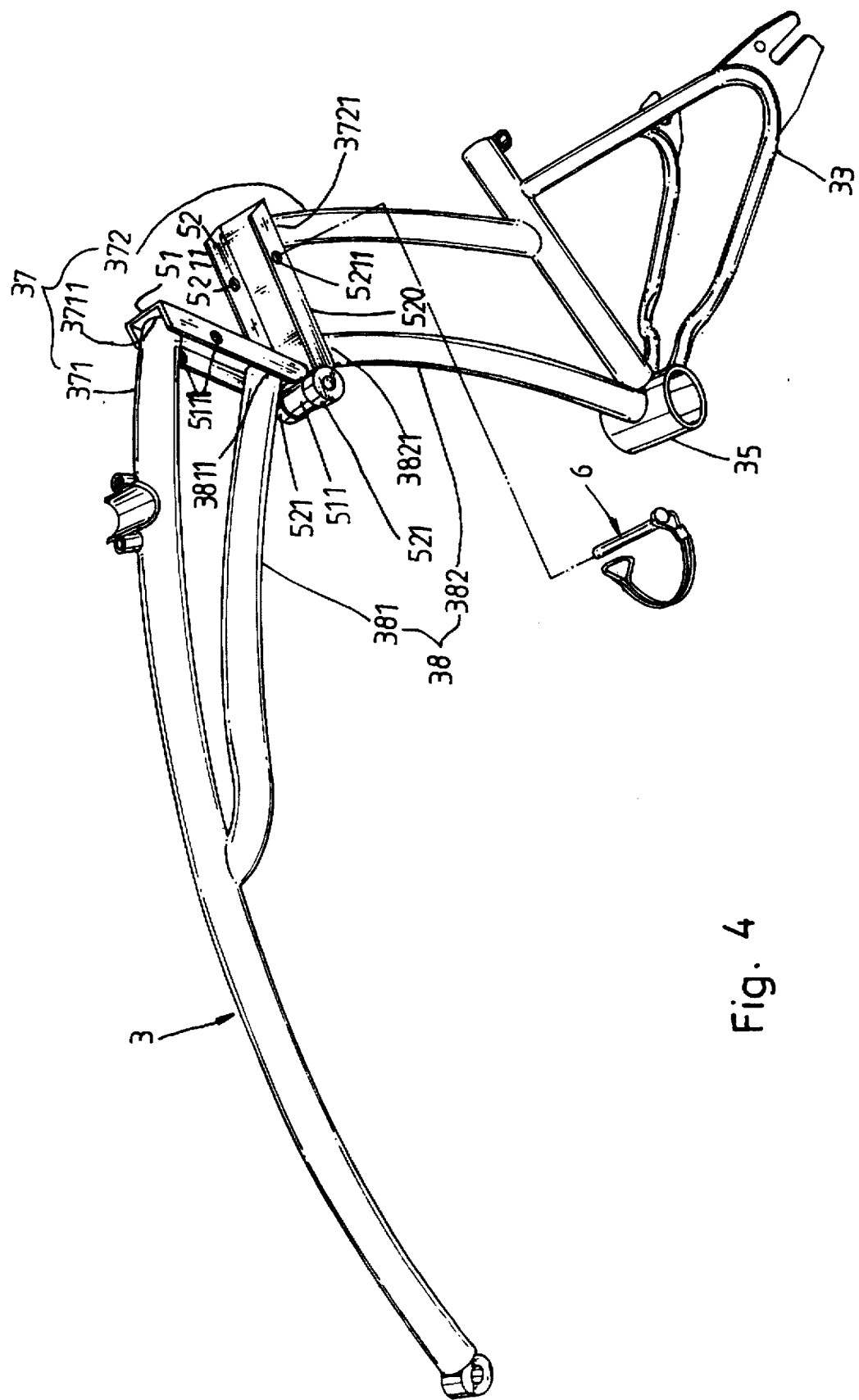
FIG. 4 is an enlarged view of the frame of the rear cycle unit of the tandem bicycle shown in FIG. 1, showing the locking pin removed from the first coupling plate and the second coupling plate.
Figure 5:
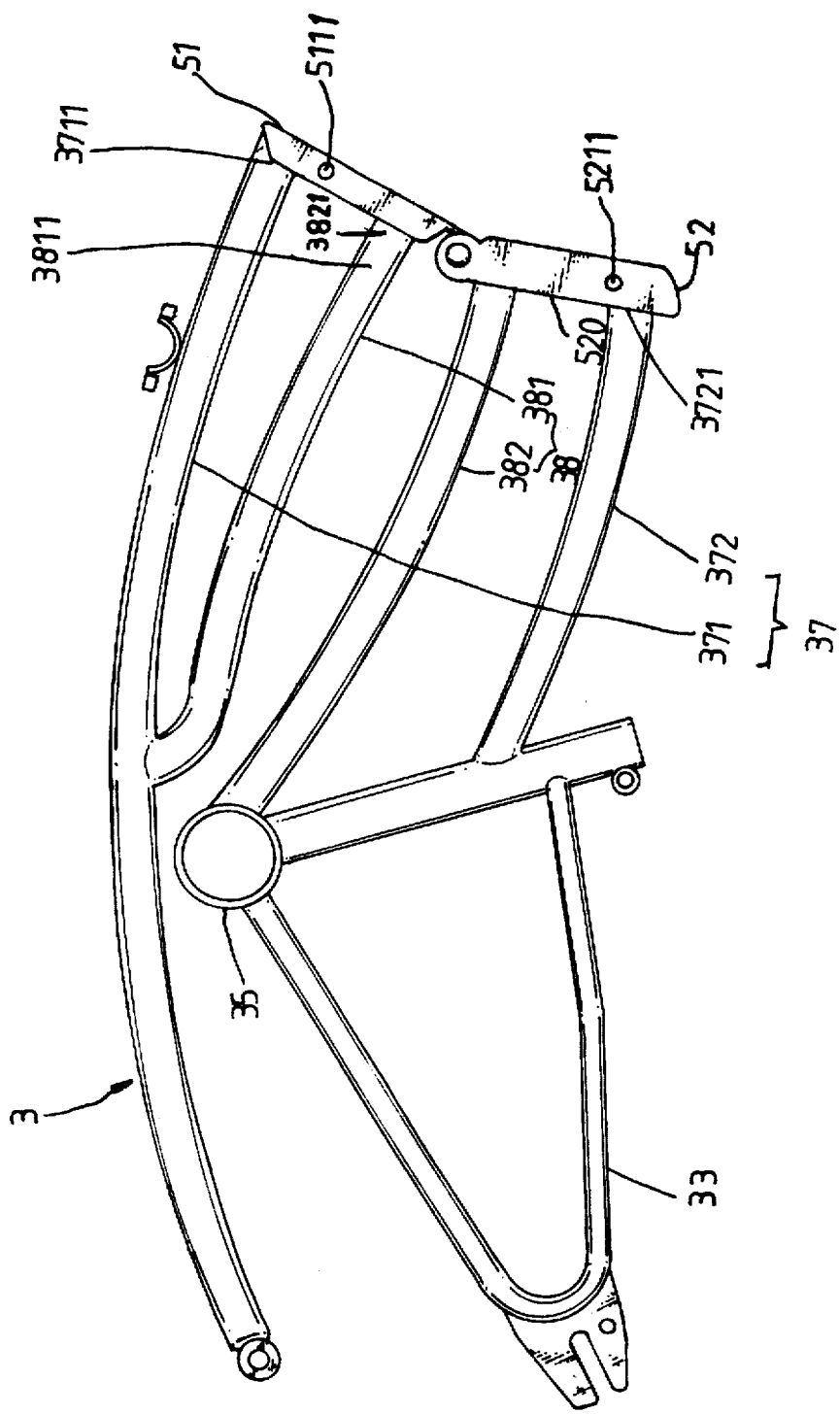
FIG. 5 shows the frame of the rear cycle unit of FIG. 4 folded up.

Referring to FIGS. 4 and 5, and FIGS. 1 and 2 again, the top tube 37 is comprised of a front top tube 371 and a rear top tube 372; the down tube 38 is comprised of a front down tube 381 and a rear down tube 382. The front top tube 371 has one end coupled to the coupling 2. The opposite end, namely, the rear end 3711 of the front top tube 371 is fixedly mounted with a first coupling plate 51. The front down tube 381 has one end fixedly secured to the middle part of the front top tube 371. The opposite end, namely, the rear end 3811 of the front down tube 381 is fixedly connected to the first coupling plate 51. The rear top tube 372 has one end fixedly connected to the seat tube 31. The opposite end, namely, the front end 3721 of the rear top tube 372 is fixedly connected to the back side 520 of a second coupling plate 52. The rear down tube 382 has one end fixedly connected to the bottom bracket 35. The opposite end, namely, the front end 3821 of the rear down tube 382 is fixedly connected to the back side 520 of the second coupling plate 52. The first coupling plate 51 has a transverse pivot pin 511 at the bottom end. The second coupling plate 52 has two barrels 521 bilaterally disposed at the bottom end and sleeved onto the pivot pin 511. Therefore, the second coupling plate 52 can be turned about the pivot pin 511 of the first coupling plate 51. The first coupling plate 51 and the second coupling plate 52 are respectively shaped like a channel tile. However, the second coupling plate 52 fits over the first coupling plate 51. Therefore, the first coupling plate 51 and the second coupling plate 52 can be closely attached together. The first coupling plate 51 has two locating holes 5111 aligned at two opposite sides far away from the pivot pin 511. The second coupling plate 52 has two locating holes 5211 aligned at two opposite sides far away from the barrels 521. When the first coupling plate 51 and the second coupling plate 52 are closely attached together, a lock pin 6 is inserted through the locating holes 5211 of the second coupling plate 52 and the locating holes 5111 of the first coupling plate 51 to secure the first coupling plate 51 and the second coupling plate 52 in the attached position (see FIG. 2). When the lock pin 6 is removed from the locating holes 5211, 5111, the second coupling plate 52 can be turned about the pivot pin 511 of the first coupling plate 51 to collapse the rear cycle unit 3.

Referring to FIGS. 1 and 2 again, a disk 361 is coupled to the crank and pedal assembly 36 at one side of the bottom bracket 35. When the child pedals the crank and pedal assembly 36, the disk 361 is rotated, however it does not turn the free wheel 34. Therefore, it is safe to a child to sit on the saddle and post assembly 32 and to enjoy riding.

Figure 6:
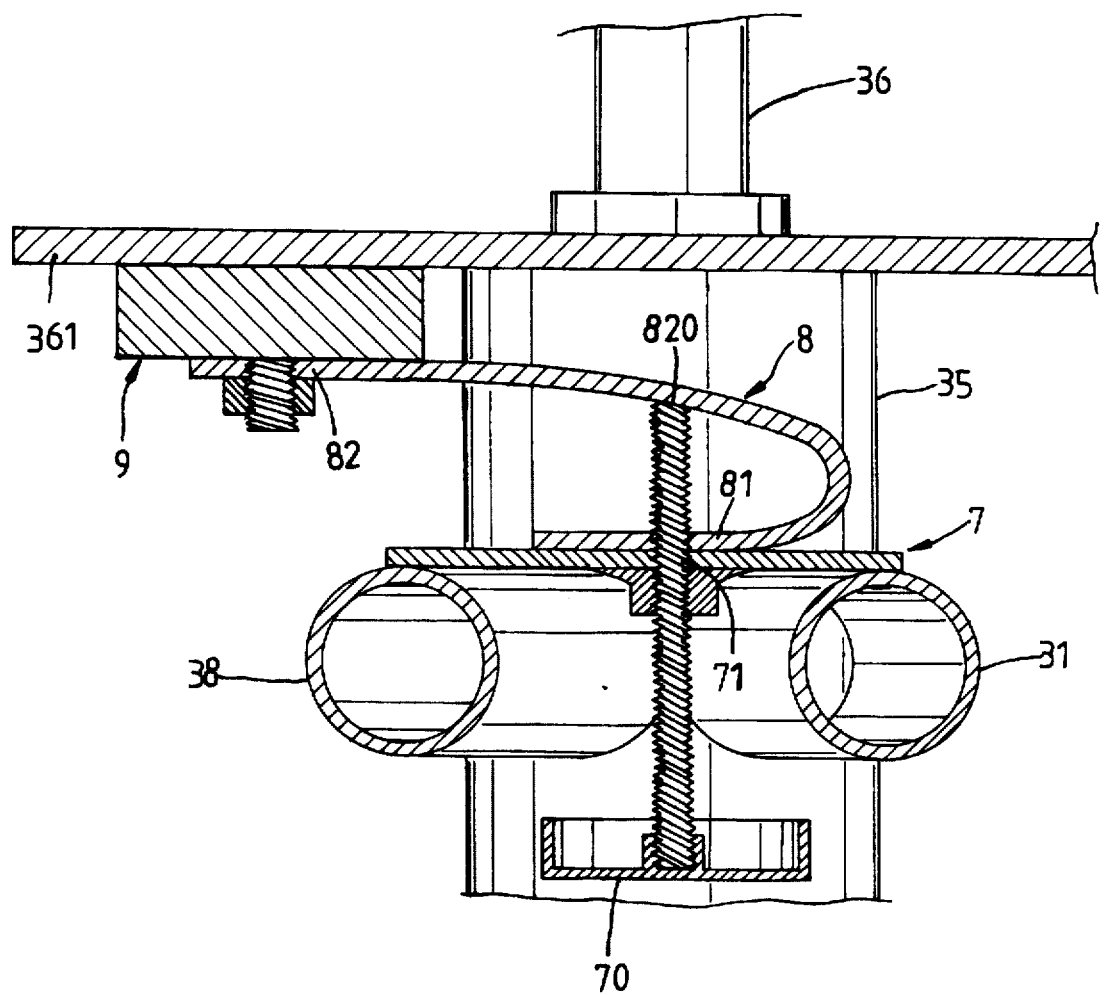
FIG. 6 is a sectional view showing an adjustable damper installed in the rear cycle unit and the friction element of the adjustable damper forced into contact with the disk of the crank and pedal assembly.
Figure 7:
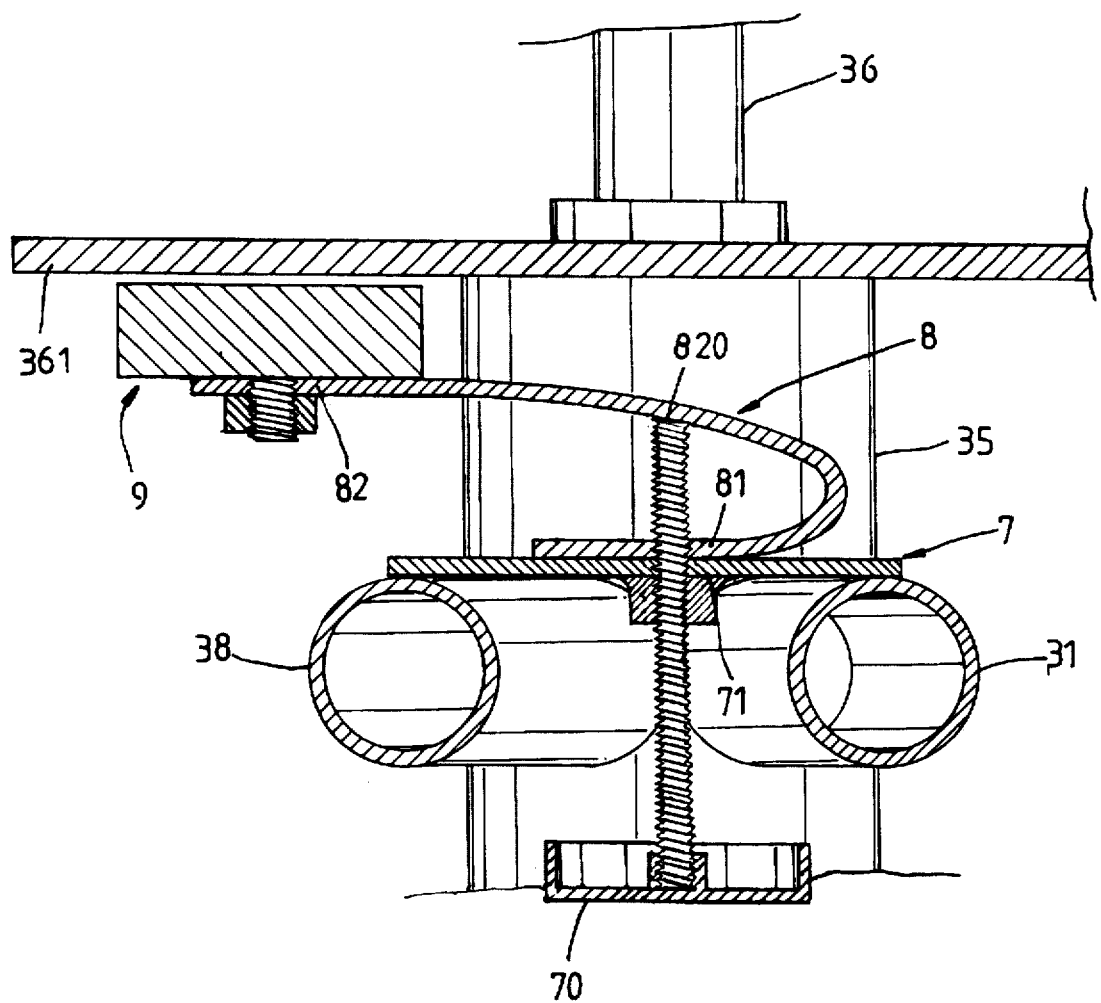
FIG. 7 is similar to FIG. 6 but showing the friction element moved away from the disk of the crank and pedal assembly.

Referring to FIGS. 6 and 7, an adjustable damper may be installed in the rear cycle unit 3 to give a damping force to the disk 361. The adjustable damper comprises a locating plate 7 fixedly connected to the seat tube 31 and the down tube 38 at the bottom and having a screw hole 71, a substantially U-shaped spring plate 8 having a front end 81 connected to the locating plate 7 and a rear end 82 fixedly mounted with a friction element 9, and an adjustment screw 70 threaded into the screw hole 71 of the locating plate 7 and inserted through a hole (not shown) on the front end 81 of the spring plate 8 and stopped at the inside surface 820 of the rear end 82 of the spring plate 8. When the adjustment screw 70 is turned outwards and released from the rear end 82 of the spring plate 8, the friction element 9 is moved away from the disk 361, therefore no damping force is given to the disk 361. When the adjustment screw 70 is threaded inwards to force the rear end 82 of the spring plate 8 toward the disk 361, the friction element 9 is forced against the disk 361, and therefore a friction resistance is produced between the friction element 9 and the disk 361 upon the rotation of the disk 361.

I claim:

1. A tandem bicycle comprising a bicycle and a rear cycle unit connected with a coupling to the seat tube of said bicycle, said rear cycle unit comprising a bottom bracket, a seat tube raised from the bottom bracket of said rear cycle unit, a saddle and seat post assembly mounted on the seat tube of said rear cycle unit, a free wheel, a seat stay and bottom fork assembly connected to the bottom bracket and seat tube of said rear cycle unit to hold the free wheel of said rear cycle unit, a crank and pedal assembly coupled to the bottom bracket of said rear cycle unit, a top tube having a rear end fixedly connected to the seat tube of said rear cycle unit and a front end coupled to said coupling, and a down tube having a rear end fixedly connected to the bottom bracket of said rear cycle unit and a front end fixedly connected to the top tube of said rear cycle unit, and a handlebar fixedly mounted on the top tube of said rear cycle unit, wherein the top tube of said rear cycle unit is comprised of a front top tube and a rear top tube, and the down tube of said rear cycle unit is comprised of a front down tube and a rear down tube, said front top tube having a front end coupled to said coupling and a rear end fixedly mounted with a first coupling plate, said front down tube having a front end fixedly secured to said front top tube and a rear end fixedly connected to said front coupling plate, said rear top tube having a rear end fixedly connected to the seat tube of said rear cycle unit and a front end fixedly connected with a second coupling plate, said rear down tube having a rear end fixedly connected to the bottom bracket of said rear cycle unit and a front end fixedly connected to said second coupling plate, said first coupling plate having a transverse pivot pin at a bottom end thereof and two through holes aligned at a top end thereof, said second coupling plate having a bottom end turned about the transverse pivot pin of said first coupling plate, and a top end made with two aligned through holes respectively connected to the through holes of the top end of said first coupling plate by a lock pin.

2. The tandem bicycle of claim 1 wherein said rear cycle unit further comprises a disk coupled to the crank and pedal assembly thereof and turned by it.

3. The tandem bicycle of claim 2 further comprises an adjustable damper controlled to give a damping force to said disk, said adjustable damper comprising a locating plate fixedly connected to the seat tube and down tube of said rear cycle unit and having a screw hole, a substantially U-shaped spring plate having a front end connected to said locating plate and made with a through hole, and a rear end fixedly mounted with a friction element, and an adjustment screw threaded into the screw hole of said locating plate and inserted through the through hole of the front end of said spring plate and stopped against the rear end of said spring plate, said friction element being forced by the rear end of said spring plate into contact with said disk when said adjustment screw is threaded forwards, or moved by the rear end of said spring plate away from said disk when said adjustment screw is turned backwards.

* * * * *